United States Patent [19]

Ritsko et al.

[11] 4,214,894
[45] Jul. 29, 1980

[54] METHOD FOR PRODUCING COBALT METAL POWDER

[75] Inventors: Joseph E. Ritsko; Richard G. W. Gingerich; Howard L. Acla, all of Towanda, Pa.

[73] Assignee: GTE Products Corporation, Stamford, Conn.

[21] Appl. No.: 38,968

[22] Filed: May 14, 1979

[51] Int. Cl.² ............................................. C22B 23/04
[52] U.S. Cl. .................................. 75/0.5 AA; 75/119; 423/143; 423/139
[58] Field of Search ......75/0.5 AA, 119, 423/143, 139

[56] References Cited

U.S. PATENT DOCUMENTS

| | | | |
|---|---|---|---|
| 2,826,499 | 3/1958 | Schlecht et al. | 75/119 X |
| 2,879,137 | 3/1959 | Bare et al. | 75/119 X |
| 3,751,558 | 8/1973 | Crnojevich et al. | 423/144 |
| 3,903,235 | 9/1975 | Cardwell et al. | 423/139 X |
| 3,903,246 | 9/1975 | Gandon et al. | 423/144 |
| 3,928,530 | 12/1975 | Bakker et al. | 75/119 X |
| 3,933,975 | 1/1976 | Nikolic et al. | 423/144 X |
| 3,933,976 | 1/1976 | Nikolic et al. | 423/144 |
| 4,093,450 | 6/1978 | Doyle et al. | 75/0.5 AA |
| 4,108,640 | 8/1978 | Wallace et al. | 75/0.5 AA |
| 4,148,816 | 4/1979 | Rappas et al. | 423/139 X |

FOREIGN PATENT DOCUMENTS 1583864 of 0000 Fed. Rep. of Germany.
2319703 of 0000 Fed. Rep. of Germany.

Primary Examiner—G. Ozaki
Attorney, Agent, or Firm—John C. Fox

[57] ABSTRACT

A method for producing extra fine cobalt metal powder (up to 1.7 FSSS) by the digestion of cobalt pentammine chloride in a dilute ammonium hydroxide solution to form a cobalt-containing precipitate, followed by reducing the precipitate in a hydrogen atmosphere to cobalt metal powder, is improved by: (a) treating the mother liquor with an ion exchange resin to remove cobalt species; (b) stripping the resin with an HCl solution; (c) recovering solid cobalt hexammine chloride from the stripping solution; (d) forming a solution of the solid in water; (e) adding NaOH to the solution to form a cobalt-containing precipitate; and (f) either heating the precipitate in hydrogen to reduce it to cobalt metal powder or recycling the precipitate as a cobalt source for the formation of cobalt pentammine chloride. The final cobalt metal powder is useful, for example, as a starting material in the manufacture of cemented carbides.

14 Claims, 1 Drawing Figure

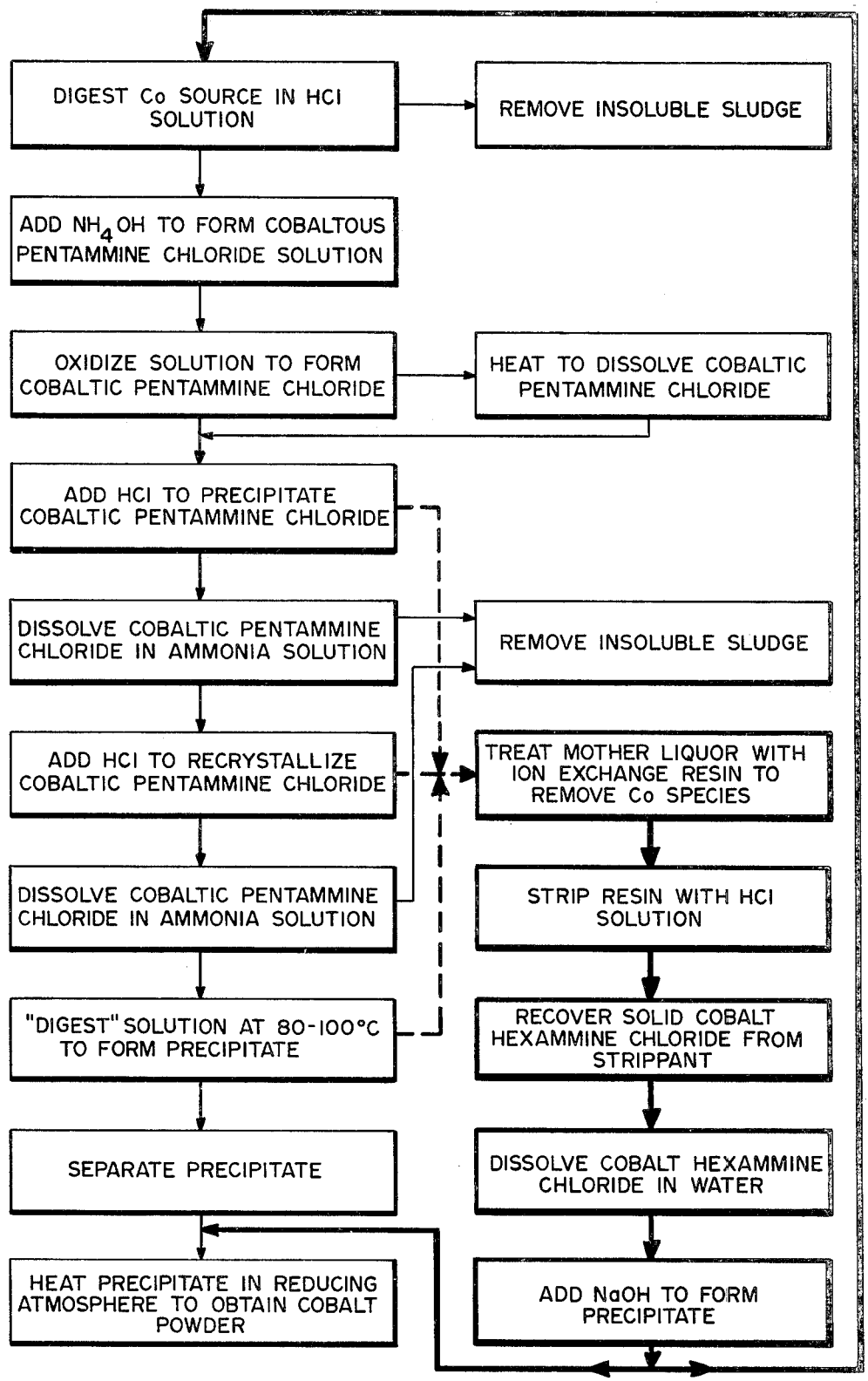

4,214,894

METHOD FOR PRODUCING COBALT METAL POWDER

TECHNICAL FIELD

This invention relates to an improved method for obtaining cobalt metal powder from a cobalt source, and more particularly relates to an improved method for obtaining such powder by the thermal reduction of a precipitate obtained by the digestion of a cobalt pentammine chloride solution.

CROSS REFERENCE TO RELATED APPLICATIONS

Co-pending U.S. patent application Ser. No. 010,769, filed, Feb. 9, 1979, a continuation of Ser. No. 911,595, now abandoned, describes a method for obtaining fine particle size cobalt by hydrogen reduction of a precipitate obtained from a cobalt pentammine chloride solution. Co-pending U.S. patent application Ser. No. 038,973, filed concurrently herewith, describes an improvement of the method of Ser. No. 010,769, involving removal of cobalt from solution by addition of a metal hydroxide. Application 038,972, also filed concurrently herewith, describes a method for the production of cobalt metal powder involving the recycling of ammonia. Application 038,971, also filed concurrently herewith, describes a method for the production of cobalt metal powder from a precipitate obtained by treatment of a cobalt ammine complex with a metallic hydroxide. Application 038,970, also filed concurrently herewith, describes a method for producing cobalt hexammine compounds and cobalt metal powder.

BACKGROUND ART

According to German Patent No. 2,319,703, it is known to separate cobalt from nickel by a method which includes forming pentammine sulfate complexes of the two ions in solution. However, it has been found that soluble cobalt ammine sulfates can only be reduced while still in solution, under pressure, and with the aid of catalysts. Furthermore, the resulting cobalt powder is not fine particle size.

U.S. Pat. No. 4,093,450 to Doyle et al. describes a method for producing fine particle size cobalt metal powder by the hydrogen reduction of cobalt oxide obtained from a cobalt pentammine carbonate solution. The precipitate was formed by heating the solution to drive off ammonia and carbon dioxide to form a precipitate of cobalt oxide. This method requires a solution of approximately four grams per liter of cobalt to produce a sized metal powder having a particle size less than one micron. Note that the final resulting particle size is highly dependent on the concentration of cobalt employed in the aqueous solution.

The following patents are directed to the separation of cobalt from other cations, especially nickel. The resulting cobalt compounds are not disclosed as being sources for forming fine particle size cobalt.

U.S. Pat. No. 2,879,137 to Bare et al. discloses the treatment of an ammoniacal ammonium carbonate solution, obtained from leaching an ore and containing nickel wherein the cobalt present in the cobaltic state is treated with an alkali metal or alkaline earth metal hydroxide under controlled temperature conditions to precipitate the nickel free of cobalt.

U.S. Pat. No. 3,928,530 to Bakker et al. discloses a method for the separation of nickel and cobalt by forming pentammine chloride complexes and solution containing a high concentration of ammonium chloride, and precipitating cobalt pentammine chloride.

In German Patent No. 1,583,864, cobalt is recovered from scrap by digestion of the scrap in HCl and $MgCl_2$ solution, followed by removal of iron and chromium impurities by precipitation at a moderately acid pH followed by extracting a cobalt chloride complex with a long chain tertiary ammine in an aromatic solvent.

U.S. Pat. No. 4,108,640 to Wallace discloses a method for recovering metallic cobalt from an aqueous ammoniacal solution wherein the solution is contacted with a water immiscible liquid ion exchange reagent dissolved in an inert organic diluent to selectively extract the other metal from the solution and produce an organic extract loaded with the other metals in an aqueous cobalt bearing raffinate substantially free of the other metals.

DISCLOSURE OF THE INVENTION

In a method for the production of cobalt metal powder by the thermal reduction of a cobalt-containing precipitate obtained by the digestion of a cobalt pentammine chloride solution, the efficiency of the method is improved by: (a) contacting the mother liquor from at least the digestion step with an ion exchange resin to remove residual cobalt species; (b) stripping the resin with a solution of a strong mineral acid such as HCl; (c) separating solid cobalt hexammine chloride from the stripping solution; (d) forming an aqueous solution of the solid cobalt hexammine chloride; (e) adding a metallic hydroxide to the solution to form a cobalt-containing precipitate; and (f) either heating the precipitate in a reducing atmosphere to convert it to cobalt metal powder, or recycling the precipitate.

The final cobalt metal powder is useful, for example, as a starting material in the manufacture of cemented carbides.

BRIEF DESCRIPTION OF THE DRAWING

The FIGURE is a flow diagram of one embodiment of the method of the invention.

BEST MODE FOR CARRYING OUT THE INVENTION

For a better understanding of the present invention, together with other and further objects, advantages and capabilities thereof, reference is made to the following disclosure and appended claims in connection with the above described drawing.

The method for producing fine particle size cobalt metal powder, herein referred to as the "basic" method, of which the present invention is an improvement, is described and claimed in copending patent application Ser. No. 010,769, filed Feb. 9, 1979, and assigned to the present assignee. However, a brief summary of one embodiment of that method will be set forth to aid the practitioner.

Cobalt pentammine chloride in solution is obtained by a method including the steps of: (1) digestion of a cobalt source in hydrochloric acid solution to obtain a solution of typically about 60 to 150 grams per liter of cobalt; (2) addition of ammonium hydroxide to result in a concentration of about 100 to 150 grams per liter of ammonium chloride and a pH of about 9.2 to 10; (3) oxidation of the cobaltous ion to cobaltic to form soluble cobaltic pentammine chloride, such as by aeration or contact with an oxidizing agent such as hydrogen peroxide or a combination of these, typically for a time of about 1 to 10 hours, and preferably about 2 to 8 hours; and (4) optional heating of the solution to a moderate temperature, for example about 80° to 90° C., in order to dissolve substantially all of the cobalt pentammine chloride.

Cobalt metal powder is then obtained by: (1) digesting the cobalt pentammine chloride solution, typically for about 2 to 10 hours at a temperature of about 80° C. to 105° C., in order to decompose the cobalt pentammine chloride and form a cobalt-containing precipitate; (2) separating the precipitate from the solution; and (3) heating the precipitate in a reducing atmosphere for a time and temperature sufficient to reduce the precipitate to cobalt metal powder, typically having a Fisher (FSSS) of 1.7 or less.

Depending upon the composition of the cobalt source and the purity desired for the final cobalt metal powder, several additional steps may be carried out. For example, after the initial digestion of the cobalt source and prior to the addition of ammonium hydroxide to the solution, it may be necessary to remove insoluble sludge, typically containing tantalum, titanium and tungsten from cobalt sources including significant amounts of scrap or sludge from cemented carbide recovery operations. Separation of precipitates or sludges from solutions in any of the above or subsequent steps may be accomplished by filtering followed by washing the filtrate. Cation impurities may be removed from the cobalt pentammine chloride solution prior to digestion to obtain the cobalt-containing precipitate by the addition of sufficient hydrochloric acid to precipitate solid cobalt pentammine chloride, followed by separation of the solid and addition to an (e.g. 1 to 6%) ammonia solution. After dissolving cobalt pentammine chloride in ammonia solution and prior to digestion, it may again be necessary to remove insoluble sludge. At this stage, cation impurities other than iron in the solution will usually be in the range of about 100 parts per million to 1 weight percent. Iron will usually be less than 1000 parts per million. Cationic impurities of less than 100 parts per million may also be achieved by one or more optional "recrystallizations" (i.e., acid precipitation followed by ammonia dissolution) of the cobalt pentammine chloride prior to digestion to form the cobalt-containing precipitate.

Reduction is typically carried out in a hydrogen atmosphere for a time of from about 1 to 6 hours at a temperature within the range of about 350° C. to 600° C.

In the above-described basic method, mother liquor from the acid precipitation steps and the second digestion step contain various cobalt species in solution. Such species may include cobalt pentammine chloride, due to incomplete conversion to the cobalt-containing precipitate, and cobalt haxammine chloride, which is incidentally formed during formation of the pentammine species, and is not converted to precipitate during digestion. The mother liquor typically contains up to 0.5 weight percent of cobalt.

Accordingly, the present invention is an improvement of the above-described basic method wherein the mother liquor from the second digestion step and any acid precipitation steps is treated to convert solid cobalt hexammine chloride to a cobalt-containing precipitate, and the precipitate either reduced to cobalt metal powder or recycled by adding it to the cobalt source for repetition of the basic method.

Referring now to the Drawing, which is a flow diagram of one embodiment of the overall method, the basic method is depicted as a multi-step method on the left-hand side of the diagram, beginning with digestion of the cobalt source in HCl solution and ending with heating to reduce the cobalt-containing precipitate to cobalt metal powder. The acid precipitation, "recrystallization" and the second digestion step of this method leaves residual cobalt species in the mother liquor.

According to one embodiment of an improvement of this method, the mother liquors from the above steps are combined, the pH adjusted to about 5.5 to 7, and any solids are removed by filtering. The mother liquor is then contacted with a weak cationic ion exchange resin such as Duolite C-464 or Duolite C-433, both weak carboxylic cationic resins, in order to remove cobalt species. The resin is periodically stripped with a strong mineral acid solution, such as an HCl solution containing about 2 to 10 weight percent HCl. As the concentration of HCl in the stripping solution increases to about 3 to 10 percent, cobaltic hexammine chloride becomes insoluble and precipitates as a yellow solid. This solid cobaltic hexammine chloride is then separated from the stripping solution, dissolved in water, typically in concentration of about 1 to 5 weight percent, and the resultant solution treated with an alkali or alkaline earth hydroxide such as NaOH, typically in the amount of about 3 to 15 weight percent, to form the cobalt-containing precipitate. This precipitate, depending upon its impurity content and the final end use envisioned for the cobalt metal powder, may after separation, either be: heated in a reducing atmosphere to form cobalt metal powder; redissolved in HCl and reprecipitated with hydroxide to remove impurities, followed by reducing to cobalt metal powder; or recycled by adding it to the cobalt source for reprocessing.

The mother liquor from the stripping solution which remains after removal of the solid cobalt hexammine chloride may be combined with the mother liquors from subsequent acid precipitation and digestion steps for treatment with the ion exchange resin.

The cobalt species-depleted effluent from the ion exchange column is typically treated to remove $NH_3$ prior to being discarded.

EXAMPLE

Mother liquors from the acid precipitation steps and the second digestion step of the basic process were combined, the pH adjusted to about 5.8 to 6.3 with $NH_4OH$ solution, and the resulting solution filtered to remove insolubles. The filtered solution was then loaded onto an ion exchange column containing Duolite C-433 weak carboxylic cationic exchange resin, manufactured by Diamond Shamrock, Redwood, Calif. The resin had previously been converted to the ammonia cycle by treatment with a 2 to 6 weight percent $NH_4OH$ solution. The effluent from the column, which contained less than than 10 parts per million of cobalt, was then loaded onto another column to reduce the cobalt level even further. The effluent from the second column contained less than 5 parts per million of cobalt. The cobalt was then removed from the resin with a stripping solution of about 4 to 10 weight percent solution of HCl. This stripping solution was used repeatedly to strip cobalt, by periodically replenishing the HCl consumed during each stripping cycle. After ten to fifteen cycles, solid material precipitated from the stripping solution. A 21.9 gram sample of this solid was separated from the stripping solution by filtration. To the solid was added 1.3 liters of water, the resultant slurry was heated to about 80° C., and the pH adjusted to about 7 with concentrated NH$_4$OH. Insoluble impurities were filtered, and the resultant cobalt hexammine chloride solution was treated with 0.9 liters of concentrated HCl solution at 80° C., cooled to 25° C., and the mother liquor from the insoluble solid cobalt hexammine chloride removed. The solid was washed with 6 Normal HCl solution to yield 20.7 grams of cobalt hexammine chloride containing the following cationic impurities:

|    | ppm |
|----|-----|
| Ca | 4.0 |
| Cu | 3.0 |
| Mg | 2.1 |
| Mn | 3.0 |
| Ni | 10  |
| Si | 14  |
| Cr | 8.0 |
| Fe | 10  |

This solid was dissolved in about 1.2 liters of hot (90° C.) water, and the resulting hot solution was treated with 0.11 liters of 50 weight percent sodium hydroxide solution over a period of 9 hours to give 20.2 grams of insoluble cobalt-containing precipitate, for a yield of 92 percent. This precipitate was heated at 400° C. in hydrogen atmosphere to obtain extra fine particle size cobalt metal powder having a Fisher Sub Sieve Size (FSSS) of about 1.0.

While there has been shown and described what are at present considered the preferred embodiments of the invention it will be obvious to those skilled in the art that various changes and modifications may be made therein without departing from the invention as defined by the appended claims.

INDUSTRIAL APPLICABILITY

The method described and claimed herein is particularly useful in the formation of extra fine particle size, (FSSS) of up to 1.7) high purity (cation impurities of less than 100 parts per million) cobalt metal powder, which is useful, for example, as a starting material in the formation of cemented carbides, e.g., tungsten carbide.

We claim:
1. An improved method for producing cobalt metal powder, the basic method comprising: digesting a cobalt source in an HCl solution, adding ammonium hydroxide to form cobaltous pentammine chloride in solution; oxidizing the solution to form cobaltic pentammine chloride; digesting the solution to form a cobalt-containing precipitate; and heating the precipitate in a reducing atmosphere to obtain cobalt metal powder; characterized by the improvement comprising:
   (a) treating the mother liquor remaining after formation of the cobalt-containing precipitate with an ion exchange resin to remove residual cobalt species from the mother liquor;
   (b) stripping the resin with a stripping solution of hydrochloric acid;
   (c) removing solid cobalt hexammine chloride from the stripping solution;
   (d) forming an aqueous solution of cobalt hexammine chloride; and
   (e) adding a hydroxide selected from the group consisting of alkali metal and and alkaline earth metal hydroxides to the solution of cobalt hexammine chloride to form a cobalt-containing precipitate.

2. The method of claim 1 wherein the precipitate formed by the addition of the hydroxide to the cobalt hexammine chloride solution is heated in a reducing atmosphere to obtain cobalt metal powder.

3. The method of claim 1 wherein the precipitate formed by the addition of the hydroxide to the cobalt hexammine chloride solution is added to the cobalt source and recycled by repeating at least the basic method of claim 1 to obtain cobalt metal powder.

4. The method of claim 2 or 3 wherein the ion exchange resin is a weak carboxylic cationic ion exchange resin.

5. The method of claim 1 wherein the stripping solution contains hydrochloric acid in the amount of about 2 to 10 weight percent.

6. The method of claim 1 wherein the cobalt hexammine chloride is present in the aqueous solution in the amount of about 1 to 5 percent.

7. The method of claim 1 wherein the hydroxide is sodium hydroxide and is added to the aqueous cobalt hexammine chloride solution in the amount of about 3 to 15 percent.

8. The method of claim 2 or 3 wherein the cobalt-containing precipitate is heated in a hydrogen atmosphere for about 1 to 6 hours at a temperature of about 350° C. to 600° C.

9. The method of claim 1 wherein following digestion of the cobalt source, and prior to formation of cobaltous pentammine chloride solution, insoluble impurity-containing sludge is removed.

10. The method of claim 1 wherein following formation of the cobaltic pentammine chloride, the solution is heated to dissolve substantially all of the cobaltic pentammine chloride.

11. The method of claim 1 wherein following formation of the cobaltic pentammine chloride, hydrochloric acid is added to the solution to precipitate cobaltic pentammine chloride, the precipitate is redissolved in ammonia solution, and insoluble impurity-containing sludge is removed.

12. The method of claim 11 wherein the steps of claim 11 are repeated one or more times to remove further impurities from the cobaltic pentammine chloride.

13. The method of claim 11 or 12 wherein the mother liquor remaining from the acid precipitation of cobaltic pentammine chloride, is combined with the mother liquor remaining after formation of the cobalt-containing precipitate, and the pH of the combined mother liquors 9 is adjusted to about 5.5 to 7, prior to treatment with the ion exchange resin.

14. The method of claim 1 wherein the mother liquor remaining after removal of the solid cobalt hexammine chloride from the stripping solution, is combined with the mother liquor remaining after formation of the cobalt-containing precipitate, prior to treatment with the ion exchange resin.

* * * * *